United States Patent [19]

Nagel

[11] 3,894,786
[45] July 15, 1975

[54] 360° VIEWABLE VEHICULAR REFLECTOR FLASHING SYSTEM
[75] Inventor: Robert I. Nagel, Skokie, Ill.
[73] Assignee: Beatrice Foods Company, Elgin, Ill.
[22] Filed: Jan. 14, 1974
[21] Appl. No.: 433,309

[52] U.S. Cl. .................. 350/99; 350/102; 350/103; 350/105
[51] Int. Cl.² .......................................... G02B 5/12
[58] Field of Search............ 280/150 R, 150 A, 156; 350/97–109, 288, 299; 116/63

[56] References Cited
UNITED STATES PATENTS

| | | | |
|---|---|---|---|
| 1,745,163 | 1/1930 | Graham | 350/99 |
| 1,813,874 | 7/1931 | Eskilson | 350/102 |
| 3,449,201 | 6/1969 | Palmquist et al. | 350/105 |
| 3,541,606 | 11/1970 | Heenan et al. | 350/103 |
| 3,781,082 | 12/1973 | Linder | 350/99 |

*Primary Examiner*—Alfred E. Smith
*Assistant Examiner*—Michael J. Tokar
*Attorney, Agent, or Firm*—Hill, Gross, Simpson, Van Santen, Steadman, Chiara & Simpson

[57] ABSTRACT

An improved retro-reflective flashing system for a vehicle, especially one having two wheels, such as a bicycle, or the like. The system uses a minimum of four retro-reflective, flattened surfaces, two of which are angularly attached to a side of a wheel member of such a vehicle, there being one reflector per vehicle side. The other two reflectors are attached to, respectively, a front and a rear wheel member each for end viewability, one such reflective surface thus being viewable from each end of such a vehicle. As the so-equipped vehicle moves, the reflective surfaces coact to provide retro-reflected light patterns which flash to the eye of a viewer situated anywhere within 360° around the vehicle horizontally.

9 Claims, 24 Drawing Figures

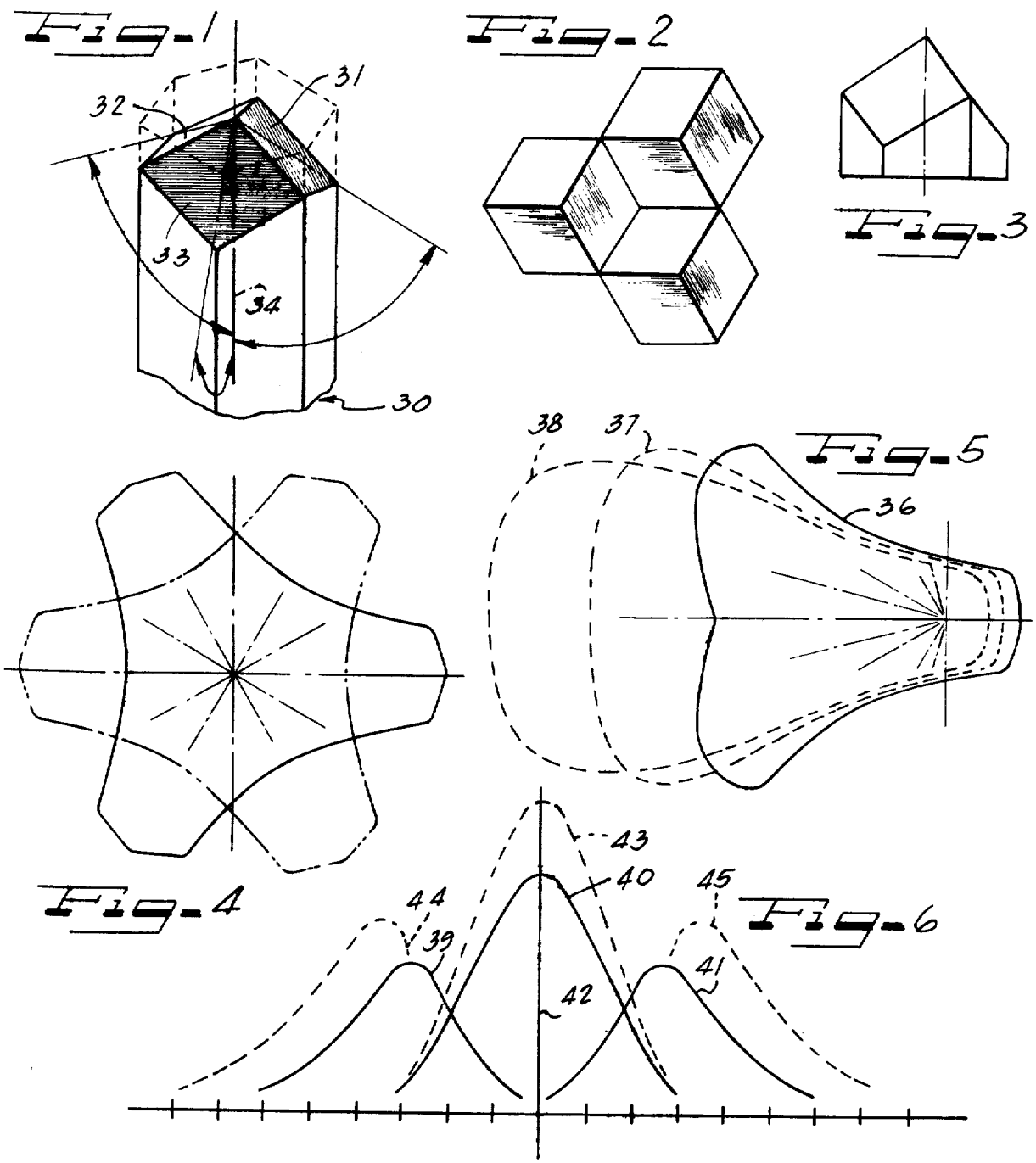
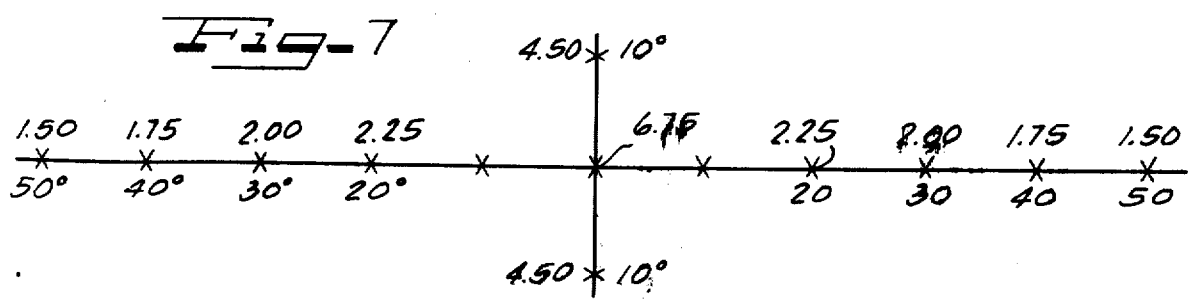

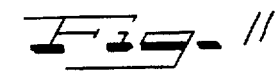
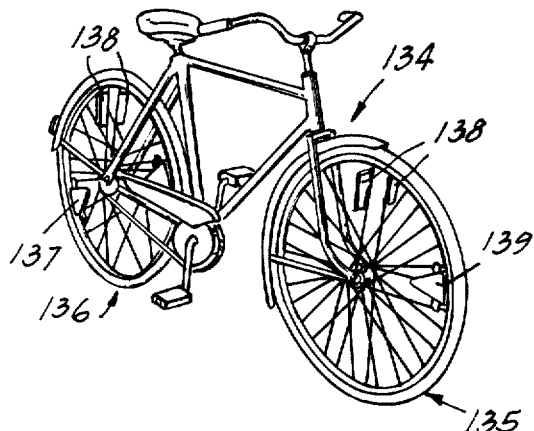
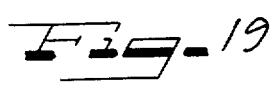
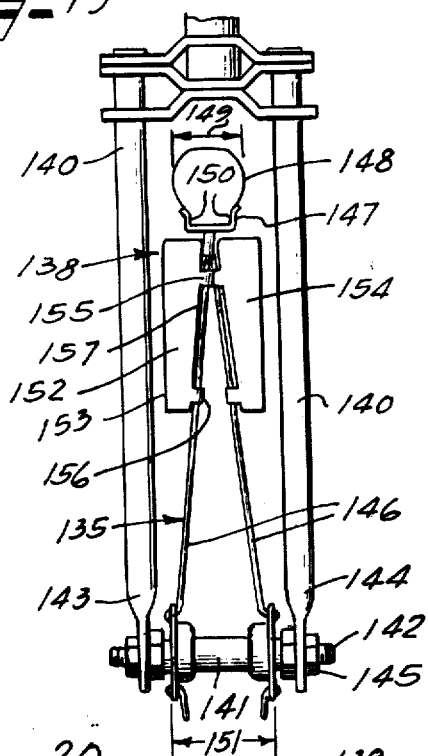
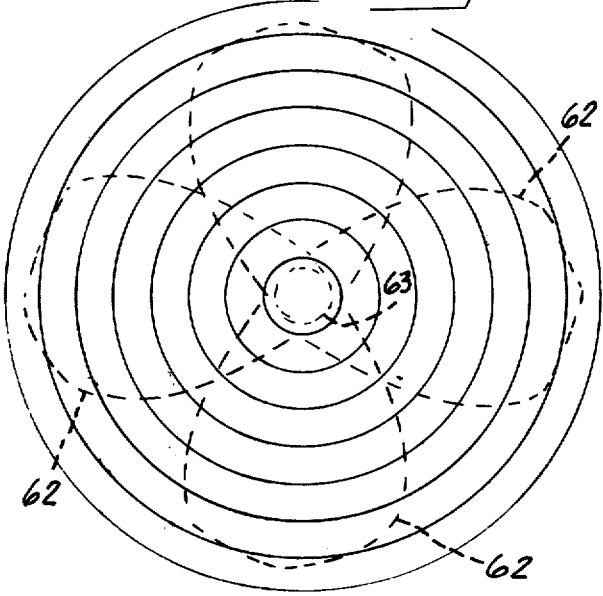
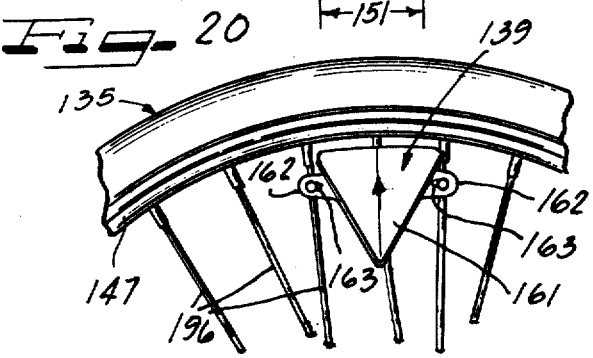
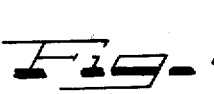
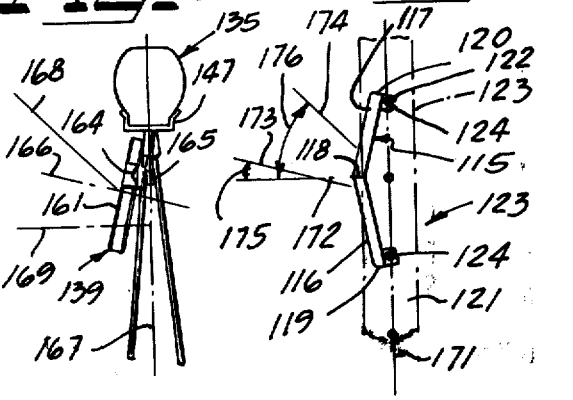

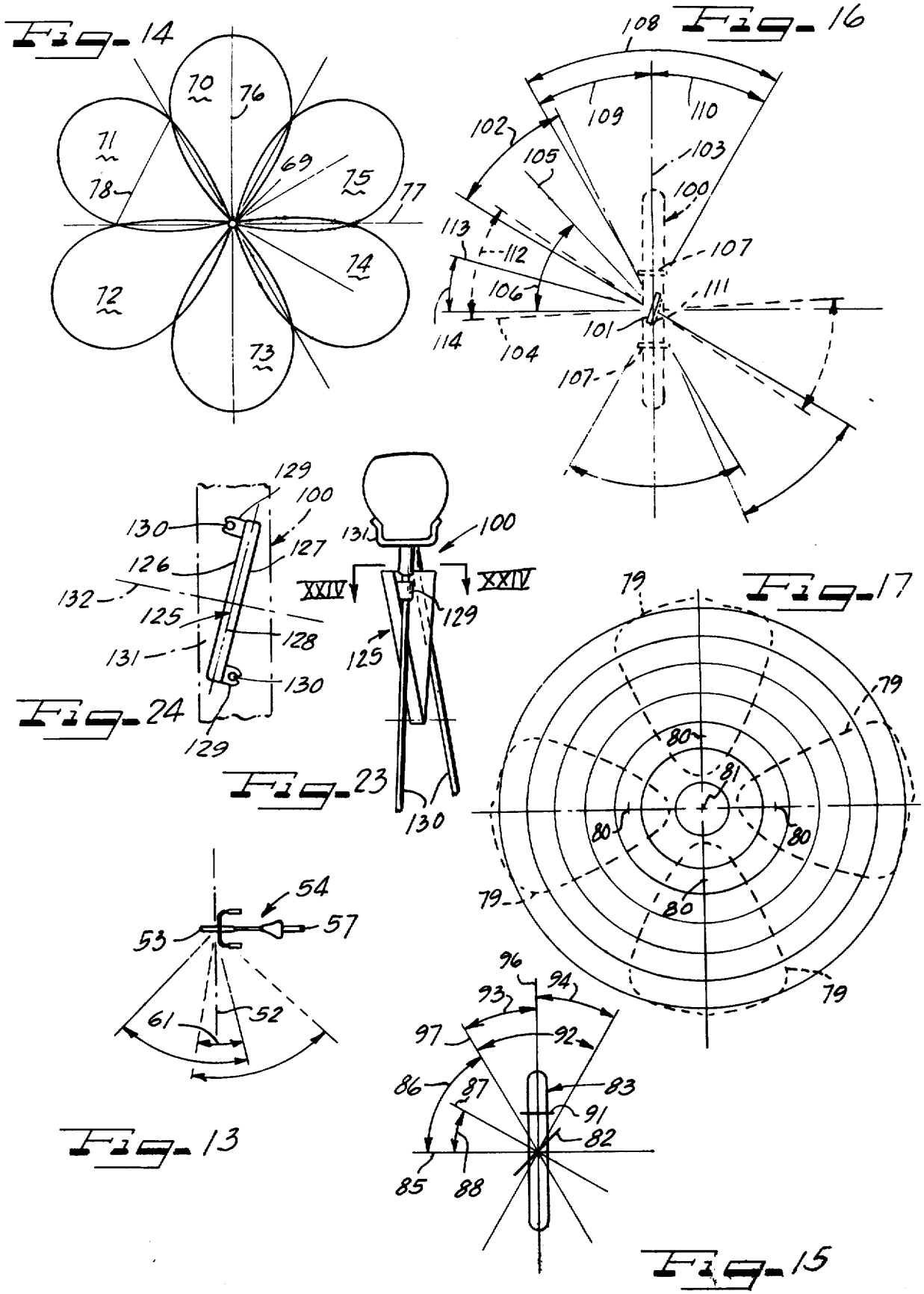

360° VIEWABLE VEHICULAR REFLECTOR FLASHING SYSTEM

BACKGROUND OF THE INVENTION

It has recently been discovered that a so-called wide angle retro reflector mounted side-wise on a revolving wheel member produces a flashing effect in the eye of a viewer, at certain retro-reflective reflection viewing angles. It has also been recently discovered that a so-called standard retro-reflector appropriately configured and mounted on a vehicle wheel for end viewability also produces a flashing effect in the eye of a viewer who is end-wise located within retro-reflective viewing angles.

It has further been recently discovered that such a side viewable, wide angle, wheel mounted retroreflector may be combined with such an end viewable, standard, wheel mounted retro-reflector to produce a flashing wheel associated reflector system adopted for viewability within 360° about a vehicle so equipped therewith as such vehicle normally moves. However, at certain viewing angles, a vehicle so equipped with such a 360° viewable, retro-reflective reflector flashing system is characterized by viewing regions where either no flashes of retro-reflected light are seen, or flashes of retro-reflected light are seen which are so weak as to be only difficulty viewable. These viewing regions can occur at angles relative to a moving vehicle which are critical since such viewing angles can occur at intersections and in passing. There is a need, therefore, for an improved reflex-reflector flashing reflector system which overcomes such "weak spots" and results in a system adopted to display strong flashing at all regions 360° horizontally around a moving vehicle.

BRIEF SUMMARY OF THE INVENTION

There has now been discovered a vehicular reflector system which is adapted to provide distinct, strong flashes of retro-reflected light at any region horizontally within 360° around a moving vehicle. The system uses at least four retro-reflective flattened surfaces. One can use only so-called standard retro-reflective reflectors, or one can use a combination of such standard reflectors with so-called wide angle retro-reflective reflectors. Thus, one preferred embodiment employs six retro-reflector assemblies, four of which are of such wide angle type.

In this system, one or more wheels of a given vehicle may be used. All of the side viewable retro-reflectors may be mounted on a single wheel, but it is preferred to use two wheels, one front wheel and one rear wheel, each equipped with a pair of wide angle retro-reflectors on each side thereof, each such reflector being mounted at a predetermined angle relative to the center plane of its associated wheel member.

It is an object of this invention to provide an improved 360° horizontally viewable retro-reflective flashing system for a vehicle, especially a two wheeled vehicle.

Another object is to provide reflector bodies especially suitable for use in such a system.

Other and further objects, purposes, advantages, aims, utilities, and features will be apparent to those skilled in the art from a reading of the present specification and drawings.

BRIEF DESCRIPTION OF THE DRAWINGS

FIG. 1 is an enlarged isometric view of one embodiment of a pin, used in the manufacture of a retro-reflective reflector;

FIG. 2 is a top plan view of the hexagonal pattern produced by a plurality of the pins of FIG. 1;

FIG. 3 is a side elevational view of one cube corner in a molded, transparent retro-reflective reflector body made from a mold which is formed using the pins of FIGS. 1 and 2;

FIG. 4 is a plot of the characteristic retro-reflective light pattern produced by a plurality of facets in a body of the type shown in FIG. 3;

FIG. 5 is a series of plots illustrating the manner in which the field of reflected light patterns change in a molded, transparent reflector body as the axes of the pins employed are angled from a vertical position to a position inclined to the vertical;

FIG. 6 shows illustrative plots of intensity versus incident angle for a reflector of the type having both standard reflector facets and wide angle reflector facets;

FIG. 7 is a plot illustrating the relationship between angle of reflected light and intensity of reflected light at such angle both horizontally and vertically for a combination of wide angle and standard reflectors in a single reflector body;

FIG. 11 is a plan view of a bicycle equipped with prior art retro-reflective system of the flashing type, illustrating the characteristic type of reflectance patterns produced;

FIG. 12 is a representative plot in polar coordinates illustrating the type of retro-reflectance pattern generated with a side viewable, wide-angle retro-reflector as employed in the system of FIG. 11;

FIG. 13 is a plan view similar to FIG. 11, but showing side zones within such prior art reflective patterns wherein no apparent flashing of retro-reflected light can occur;

FIG. 14 is a plan view similar to FIG. 11, but illustrating one type of characteristic retro-reflected light pattern generated with one embodiment of a retro-reflective system of the present invention, wherein flashing of retro-reflected light occurs at any location horizontally within 360° around a vehicle equipped with such system;

FIG. 15 is a diagrammatic plan view of a wheel member equipped with reflector bodies in one manner taught by the present invention which also shows the regions covered by the reflectance patterns generated by such bodies as the wheel member revolves upon its axis;

FIG. 16 is a view similar to FIG. 15 but showing another such manner;

FIG. 17 is a representative plot in polar coordinates illustrating the type of retro-reflective patterns generated with a side viewable wide-angle retro-reflector such as employed in the system of FIGS. 14 and 15;

FIG. 18 is an isometric view of a bicycle whose wheel members are each equipped with reflector bodies in the manner taught by FIGS. 14, 15 and 16;

FIG. 19 is a fragmentary vertical sectional view through the front wheel of the bicycle shown in FIG. 18 showing the embodiment of the end viewable reflector assembly associated therewith;

FIG. 20 is a fragmentary side elevational view of the front wheel of the bicycle shown in FIG. 18 showing the embodiment of the side viewable reflector assembly associated therewith;

FIG. 21 is a fragmentary vertical sectional view through the front wheel of the bicycle shown in FIG. 18, but showing the side viewable reflector assembly of FIG. 20;

FIG. 22 is a fragmentary transverse sectional view of an alternative embodiment of a side viewable reflector assembly adapted for use in the present invention;

FIG. 23 is a view similar to FIG. 21 but showing another alternative embodiment of a side viewable reflector assembly useful in the practice of the present invention; and FIG. 24 is a transverse sectional view taken along the line 24—24 of FIG. 23 showing the side viewable reflector assembly of FIG. 23.

DETAILED DESCRIPTION

Figure 8:
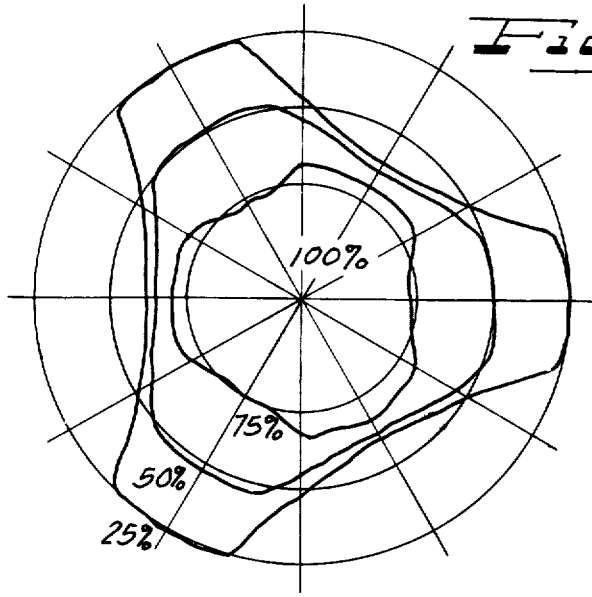
FIG. 8 is a plot in polar coordinates showing curves illustrative of the type of retro-reflectance produced by a reflector equipped with one section of standard type retro-reflective facets.

The relationship between a group of facets in a conventional so-called standard retro-reflective reflector (which, characteristically, is considered to be adapted to retro-reflect impinging incident light over angles of about ±30° usually horizontally) and a group of facets in conventional so-called wide-angle retro-reflective reflector (which, characteristically, is considered to be adapted to retro-reflect impinging incident light over angles ranging from at least about 30° up to at least about 45° in one direction, usually horizontally as illustrated by FIGS. 1 through 7. In the manufacture of retro-reflective reflector elements of such conventional types, which are incorporated into the systems of the present invention, a plurality of so-called pins 30 may be employed. Each pin, as shown here, is hexagonally shaped. The transverse distance between flat sides is variable, but is typically of the order of about 0.094 inches while the distance between opposing edge sides is also variable, but is typically of the order of about 0.108 inches. Three facets 31, 32 and 33 are formed at the forward end of each pin 30. Each facet 31, 32 and 33 traverses two sides of the hexagonal pin 30 and has an apex coinciding with the axis 34 of each pin 30. Each facet has an angle relative to the axis of about 35¼°.

The pins are arranged into a pattern, such as shown, for example, in FIG. 2, and an electroform mold, or the like, is made therefrom using such pin pattern, the electroform mold being currently made by electroplating nickel of the like onto and over a plurality of aligned pin 30 faceted heads. In such process, the high points and the low points, respectively, over such an aligned group of faceted heads are reversed in mirror image fashion in the product electroform mold over their respective positions in the pin pattern, as those skilled in the art will appreciate. From the product mold, a transparent, plastic reflector element is moldable. A section through one molded facet in a resulting reflector so made is shown, for example, in FIG. 3.

When such a reflector body having such a plurality of individual facets, such as shown, for example, in FIG. 3, is caused to retro-reflect incident light, a characteristic plot of reflectance angle versus light intensity results, such as illustrated by the solid line in polar coordinate plot shown in FIG. 4. If one rotates the pins of FIG. 2 through 180° and makes a mold, and then a reflector, such reflector has a pattern of reflected light as shown by the dotted line of FIG. 3. However, when one tilts the axis 34 of each pin 30 of a plurality thereof arranged in a pattern, such as shown, for example, in FIG. 2, from the vertical position shown in FIGS. 1–3 through increasing angles of common inclination relative to pin axes 34, there is produced a family of characteristic plots of reflectance angle versus light intensity, such as shown in FIG. 5, each succeeding plot 36, 37 and 38 representing a greater common inclination angle for each of a group of pins, which are electro formed into a mold, and then the mold used to make a reflector body. When one tilts the axes 34 of such a plurality of such pins 30 in the opposite direction, there is then produced a changing family of characteristic curves like those in FIG. 5, but reversed by 180° (not shown). The plots of FIGS. 4 and 5 are not for any specific reflectors, but are given herein to illustrate the known principles involved.

When one combines into a single reflector body both the type of reflex reflectance shown in FIG. 5 with the type shown in FIG. 4, there is produced in a single reflector body both such types of reflex reflectance, that shown in FIG. 4 sometimes being known as "standard" reflectance, which has a characteristic reflectance value generally given as ±30°, and that shown in FIG. 5 sometimes being known as "wide angle" reflectance, which has a characteristic reflectance value which can range very widely from about 10° to 88°, though values between about 25° and 70° are particularly and preferably useful. To achieve horizontal side viewability in both left and right directions, of course, two different groupings of wide angle facets are used, one group having pin axes reversed relative to the other. Such a combination reflector body displays a characteristic plot of retro-reflectance angle versus reflected light intensity, as shown, for example, in FIG. 6 by curves 39, 40 and 41 wherein the curve 40 is produced by a combination of both of the so-called standard retro-reflective facets of FIG. 4, the curve 39 is produced by the so-called wide angle retro-reflective facets sensitive to light on the left side of the ordinate 42, and the curve 41 is produced by the so-called wide angle retro-reflective facets sensitive to light on the right side of the ordinate 42.

If, for example, the number of standard facets is increased, the amount of reflected light therefrom increases, and there is produced a reflectance curve, such as, for example, the dotted curve 43. If, for example, both the number of wide angle facets and their respective angles of inclination are increased for both right and left hand members, the dotted reflectance curves 44 and 45, respectively, result. For example, U.S. government federal standards for a bicycle reflector comprising such a combination of left and right wide angle reflector facets in further combination with centrally viewable standard reflector facets are shown in FIG. 7, where, for each degree of reflectance horizontally or vertically measured the corresponding intensity in candlepower per foot candles of reflected light is indicated. By combining different pin 30 groupings at different respective facet axis 34 angles, as those skilled in the art will appreciate, one can produce an almost unlimited gradation of retro-reflectance characteristics in a given retro-reflector, so that any given desired reflector or set of reflectance characteristics can be produced in a given reflector by one skilled in the art within the limitations of pins, materials of construction, design standards, and the like, using known technology.

In FIG. 8 is shown in polar coordinates a family of curves showing retro-reflected light characteristics for one embodiment of a standard retro-reflector wherein a plurality of pins (and, consequently, facets molded in the back of the reflector surface) are oriented in the manner shown, for example, in FIG. 2. Observe that, in the region next to the origin, a small zone of 100% reflectivity is provided, and, as one moves radially outwardly, the percentage (or efficiency) of retro-reflectance drops, as shown.

Figure 9:
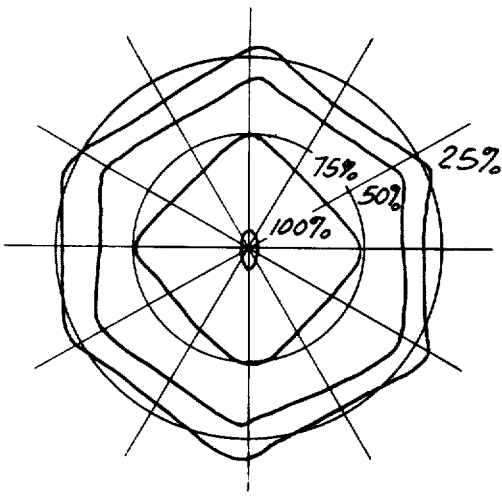
FIG. 9 is another plot in polar coordinates showing further curves illustrative of the type of retro-reflectance produced by a reflector equipped with two sections of standard type retro-reflective facets; each section having 180° opposite pin orientation relative to the other thereof.

In FIG. 9 is shown a family of retro-reflected light curves in polar coordinates for one embodiment of a standard retro-reflector equipped with two different groups or sections each comprised of a plurality of pins (and, consequently facets) in which one section of pins (or facets) is oriented as shown in FIG. 2 while the second section is oriented as though the FIG. 2 pins had been rotated through 180°. Observe that, with this type of construction the characteristic curves produced by one such section as shown in FIG. 8 is changed. This change is caused by retro-reflected light produced from the effectively superimposed curves from each such section. Observe, that, just as in the case of FIG. 8, a small region of 100% reflex reflectivity exists near the origin, and that the percentage (or efficiency) of retro-reflected light drops as one proceeds radially outwardly away from the origin.

Figure 10:
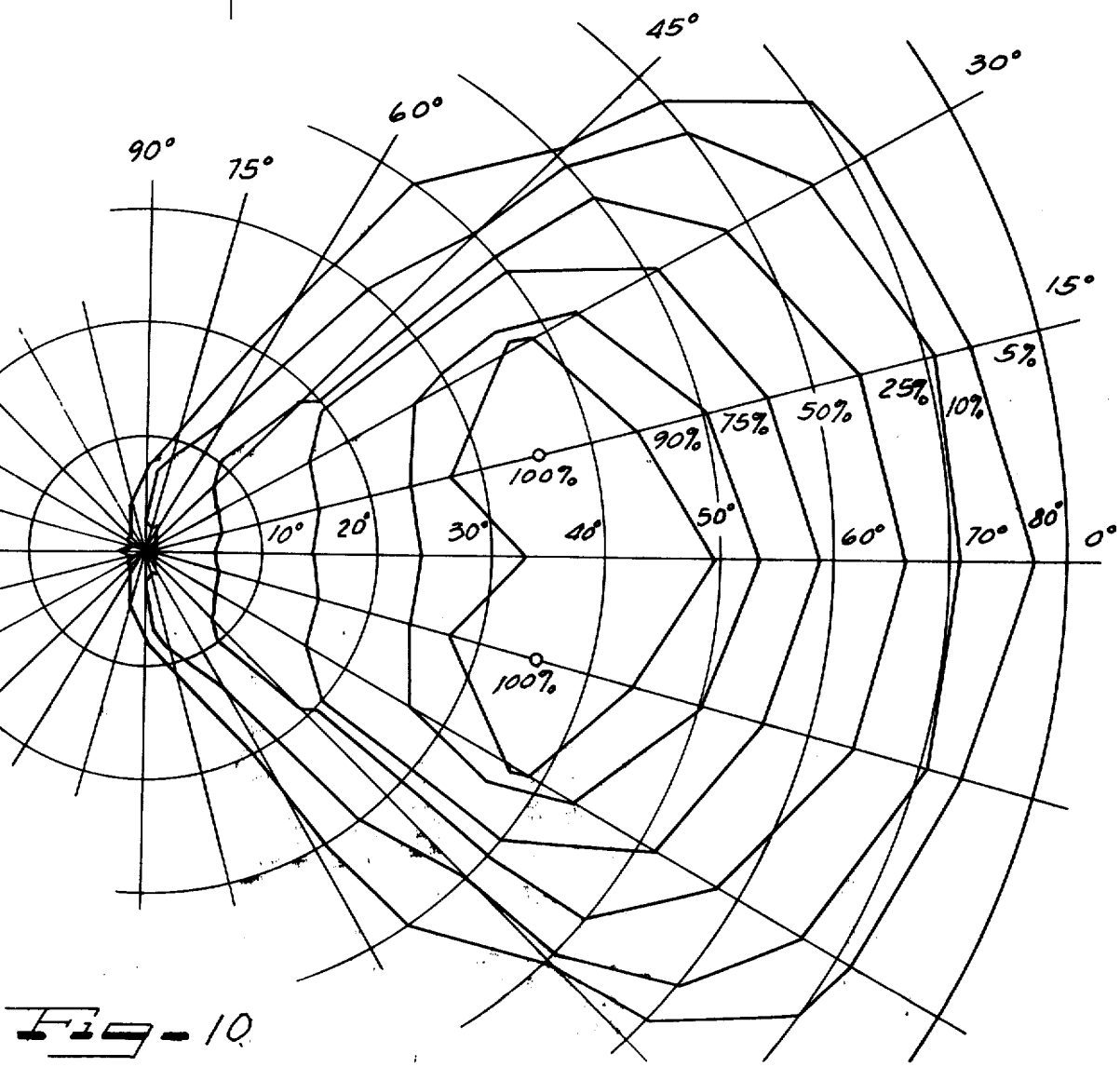
FIG. 10 is another plot in polar coordinates but showing curves illustrative of the type of retro-reflectance patterns produced by a reflector equipped only with wide-angle retro-reflective facets.

In FIG. 10 is shown in polar coordinates a family of curves of retro-reflected light for one embodiment of a particular wide angle retro-reflective surface which is side reflective in one direction. Observe that 100% retro-reflectivity is obtained at two small regions each inclined at an angle of about 15° with respect to the horizontal and at an angle of about 35° with respect to the vertical. The percentage of retro-reflectivity decreases with increasing angles of incident light. Observe that retro-reflectance is achieved over a wide range of from about 6° through about 77° in the particular embodiment shown in FIG. 10 but is more efficient in the range from about 15° to 55° in terms of percentages of retro-reflected light, and is most efficient between about 30° and 40°.

When a reflector of the type illustrated in, for example, FIGS. 8 or 9 is mounted upon the side of a revolving wheel member parallel to the center plane thereof, only slight relative variations in the intensity of retro-reflected light occur from the standpoint of a viewer situated within the retro-reflective viewing angle associated with such a reflector, regardless of reflector position on the wheel member, so that, as a wheel revolves, a more or less constant source of reflected light is viewed by such a viewer. On the other hand, when a reflector, such as is illustrated in FIG. 10 is mounted upon the side of a wheel member parallel to the center plane thereof, and such wheel member is revolved, the light pattern emitted retro-reflectively by the reflector is only intermittently seen by a viewer situated within retro-reflective viewing angles of the reflector body. As a consequence, such viewer sees a flashing source of retro-reflected light caused by the fact that the retro-reflective surface moves into and out of such viewer's line of vision on a continuing and regular basis as the wheel revolves. A wide angle, side viewable retro-reflective surface mounted on a revolving wheel as indicated produces a characteristic flashing effect not possible with a standard reflective surface.

If one equips, for example, each wheel of a bicycle with a side viewable, wide angle, retro-reflective reflector in such a manner that a perpendicular to the center plane of each wheel is perpendicular to each such wide angle reflector on each wheel, each such reflector is side viewable over a relatively wide viewing angle, such as angle 51 in FIG. 11. Commonly, this included angle 51 can be from about ±60° to 70° on either side of such a vertical or perpendicular 52, relative to the center plane of one wheel member 53 of a bicycle 54. A similar situation prevails upon the opposite side of the bicycle 54 with reference, for example, to a vertical or perpendicular 55 and included angle 56 with respect to a rear wheel 57 of bicycle 54. When each wheel 53 and 57 is also equipped with an end viewable reflector adapted for end viewable retro-reflective flashing over an included angle 58 over the front region of the bicycle 54, and also over an included angle 59 over the rear region of the bicycle 54, there is produced an arrangement which is considered known to the prior art at the time of this invention and which arrangement provides a form of flashing over many different viewing angles within a circumference of 360° about a bicycle.

An important and peculiar feature associated with such prior art 360° reflector system, as such is shown and illustrated in FIG. 11, is demonstrated in FIG. 13. Here, a conically shaped region 61 three-dimensionally located about the perpendicular 52 to the center of wheel 53 of bicycle 54 exists for such a side viewable, wide angle reflector as wheel 53 revolves. In region 61 a generally steady retro-reflected light is continuously viewable. As respects wheel member 53, no flashing light effect is thus visible in this region 61 as the wheel 53 revolves when the bicycle 54 is in motion and being operated normally. Depending upon the angle of viewing a particular bicycle 54, the region 61 can sometimes be offset to a limited, unreliable extent by the flashing light emitted from a similar reflector side mounted upon the rear wheel 57 thereof (not illustrated in FIG. 13).

The reason for this apparent constant source of light in the region 61 may be understood by reference to FIG. 12. As a wide angle reflector element revolves about a wheel, for example, wheel 53 in FIGS. 11 and 13, a three dimensional zone 62 of retro-reflected light is being continuously generated. This zone 62 appears to revolve around the wheel axis, illustrated by point 63 in FIG. 12 (which point 63 may be considered to be the origin in the plot of FIG. 12). Even up to appreciable viewing angles with respect to origin 63, no change or alteration in the amount of retro-reflected light occurs for the reason that light is being retro-reflected by the wide angle side viewable reflector in a pattern which includes not only the origin 63 but a region adjacent thereto. In the particular embodiment, as illustrated, for example, in FIG. 10, this overlap angle upon the origin is approximately 6°. However, depending upon the particular form of construction of a wide angle reflector, such an angle of overlap can extend beyond the origin and can be as much as 30° or 40° or perhaps even more depending upon the angle of inclination of the pin elements used to generate a particular reflector, as hereinabove discussed. In general, for a wide angle reflector to be used in this invention it is preferred to keep the overlap angle around the origin less than about 15°, and more preferably less than about 10°, and most preferably less than about 7°. However, in the area around the origin, a viewer within the viewable retro-reflectance angle adjacent the origin sees only a continuous source of light which does not flash as a side viewable, wide angle, retro-reflector revolves about a wheel member 53 producing the zone 61 in FIG. 13.

Another important and peculiar feature of such prior art system is that, referring to FIG. 11, at the respective regions of overlap between angles 58 and 51, between angles 51 and 59, between angles 59 and 56, and between angles 56 and 58, the flashing signal is inherently weak because of the characteristically reduced level of retro-reflected light in such side regions of retro-reflectivity, and because of the characteristically declining percentages in quantities of retro-reflected light occurring at increasing angles of retro-reflection.

To overcome these prior art undesirable features, there is provided, in accordance with the present invention, a vehicular reflector system which produces a plurality of retro-reflected discontinuous light patterns which may be regarded as causing flashes of retro-reflected light to a viewer observing a particular moving vehicle such as a bicycle, equipped therewith. An illustrative pattern is shown in FIG. 14. Here what may be regarded as six three-dimensional regions or patterns of moving light are being generated in response to incident light as a vehicle 69 moves along straight path 76. Vehicle 69 is shown as a point but may be considered to be a bicycle. Each such pattern is numbered, respectively, as 70, 71, 72, 73, 74 and 75. The patterns 70 and 73 are associated with opposite end regions of the bicycle 69, and these patterns are moving revolvably in the plane indicated by center line 76 in FIG. 13, which line 76 corresponds to the direction of travel or path of the bicycle 69.

The patterns 71 and 72 have centers on one side of the bicycle 69 which appear to be moving in a conical manner about an axis 77 which extends normally to the center line 76 and parallely to the axes of the wheels of the bicycle. The light patterns 75 and 74 are similarly moving with respect to the axis 77. The interrelationship between radially adjacent pattern pairs 70 through 75 is chosen to be such that there are no gaps between such radially adjacent pairs of patterns preferably over relatively great radial distances from the bicycle. The flashing effect thus produced by each individual pattern is also chosen to be bright enough, to be visible at all points within an individual pattern, such as one of 70 through 75, to a viewer situated at any retro-reflective point within 360° about such bicycle. The patterns 70 through 75 would be coplanar as shown in FIG. 14 only at one instant in time, and in an actual situation the individual shapes of the patterns 70 through 75 could easily vary from those shown in FIG. 14.

In general, to produce the type of strongly flashing retro-reflected light patterns of the general type illustrated in FIG. 16 anywhere within the entire 360° circumferential region about a vehicle 69, one equips one outside of one wheel member of vehicle 69 with a first side viewable retro-reflector means. Such first side viewable retro-reflector means is so mounted on such wheel member that its mid region of retro-reflectance occurs sidewards preferably generally symmetrically along and about a straight line. This line is inclined at an angle of from about 25° to 35° with respect to a perpendicular to the center plane of the associated such wheel member.

In addition, one also equips a front wheel member of vehicle 69 with a first end viewable retro-reflector means. Such first end viewable retro-reflector means is so mounted on such wheel member that its mid-region of retro-reflectance occurs forwardly relative to such vehicle 69 preferably generally symmetrically along and about a straight line which is parallel to (and may be actually in an extension of) the center plane of such associated wheel member.

In addition, one also equips a rear wheel member of vehicle 69 with a second end viewable retro-reflector means. Such second end viewable retro-reflector means is so mounted on such wheel member that its mid-region of retro-reflectance occurs rearwardly relative to such vehicle 69 preferably generally symmetrically along and about a straight line which is parallel to (and may actually be in an extension of) the center plane of such associated wheel member.

In addition, one also equips on the opposite side of such vehicle 69, one outside of one wheel of vehicle 69 with a second side viewable retro-reflector means. Such second side viewable retro-reflector means is so mounted on such wheel member that its mid-region of retro-reflectance occurs sidewards preferably generally symmetrically along and about a straight line. This line is inclined at an angle of from about 25° to 35° with respect to a perpendicular to the center plane of the associated such wheel member.

Each of these said side viewable retro-reflector means is adapted to retro-reflect light continuously through an angular range which is at least about 30° around its respective such mid-region of retro-reflectance. In addition, each such side viewable retro-reflector means is further adapted to retro-reflect light at about 30° from such mid-region of retro-reflectance at an efficiency which is not less than about 25% of its light reflectance efficiency along such mid-region of retro-reflectance.

Each of these said end viewable retro-reflector means is adapted to retro-reflect light continuously through an angular range which is at least about 30° around its respective such mid-region of retro-reflectance. In addition, each such end viewable retro-reflector means is further adapted to retro-reflect light at about 30° from such mid-region of retro-reflectance at an efficiency which is not less than about 25% of its mid-region of retro-reflectance.

Each of these side viewable retro-reflector means and each of these end viewable retro-reflector means is adapted to retro-reflect incident light in the vicinity of its respective mid-region of retro-reflectance at an average efficiency of at least about 75%.

The interrelationship between wheels and reflectors is such that 360° flashing results during vehicle operation.

It will be appreciated that one may use in a system of this invention all standard retro-reflectors, or, alternatively, a combination of wide angle and standard reflectors, as desired. Thus, in one preferred mode of practicing the present invention, the system involves:

A. on one side of such a vehicle, equipping one side of one wheel member thereof with a first side viewable retro-reflector means such first side viewable retro-reflector means being so mounted on such wheel member that its peak of retro-reflectance occurs sidewards generally along a straight line which is inclined at an angle of from about 40° to 50° with respect to a perpendicular to the center plane of the associated such wheel member, B. on the same side of such vehicle, equipping one side of one wheel member thereof (which wheel member can be the same or different wheel member from that in (A)) with a second side viewable retro-reflector means, such second side viewable retro-reflector means being so mounted on such wheel member that its peak of retro-reflectance occurs sidewards generally along a straight line which is inclined at an angle of from about 10° to 20° with respect to a perpendicular to associated such wheel member, C. on such vehicle, equipping a front wheel member thereof with a first end viewable retro-reflector means, such first end viewable retro-reflector means being so mounted on such wheel member that its peak of retro-reflectance occurs forwardly generally along a straight line which is parallel to the center plane of the associated such wheel member, D. on such vehicle, equipping a rear wheel member thereof with a second end viewable retro-reflector means such second end viewable retro-reflector means being so mounted on such wheel member that its peak of retro-reflectance occurs rearwardly generally along a straight line which is parallel to the center plane of the associated such wheel member, E. on the opposite side of such vehicle, equipping one side of one wheel member thereof with a third side viewable retro-reflector means, such third side viewable retro-reflector means being so mounted on such wheel member that its peak of retro-reflectance occurs sidewards generally along a straight line which is inclined at an angle of from about 49° to 50° with respect to a perpendicular to the center plane of the associated such wheel member, F. likewise on such opposite side of such vehicle, equipping one side of one wheel member thereof (which wheel member can be the same or different wheel member from that in (E), with a fourth side viewable retro-reflector means, such fourth side viewable retro-reflector means mounted on such wheel member that its peak of retro-reflectance occurs sidewards generally along a straight line of which is inclined at an angle of from about 10° to 20° with respect to a perpendicular in the center plane of the associated such wheel member, G. each of said side viewable retro-reflector means being a adapted to 1. retro-reflect light continuously through range of about 15° around its respective such line of peak retro-reflectance;
2. retro-reflect light at about 15° from such line of peak retro-reflectance at an efficiency which is not less than about 25% of its light reflectance efficiency along such line of peak retro-reflectance;

H. each of said end viewable retro-reflector means being adapted to
1. retro-reflect light continuously through a range of about 30° around its respective such line of peak retro-reflectance;
2. retro-reflect light at about 30° from such line of peak-reflectance at an efficiency which is not less than about 25% of its light reflectance efficiency along such line of peak retro-reflectance; and I. each of said viewable and each of said end viewable respective retro-reflector means being adapted to retro-reflect incident light in the vicinity of its respective line of peak retro-reflectance at an efficiency of at least about 90%.

Thus, to produce the type of reflectance pattern illustrated in FIG. 14, one reflector 82, is, for example, associated with one side of a wheel member, such as wheel 83 in FIG. 15, in such a manner that reflector 82 produces a retro-reflected light pattern over an angle 86 measured from the perpendicular line 85 to the center plane 90 of wheel 83. Perpendicular 85 in this example coincides with the axis of wheel member 83. The mid-region of retro-reflectance occurs generally along line 87, which is inclined at an angle 88 with respect to perpendicular 85, angle 88 in this example being one-half of angle 86. Angle 88 ranges from about 25° to 35° and preferably is about 30°.

Wheel 83 is further equipped with an end viewable reflector assembly 91 in such a manner that reflector assembly 91 produces a retro-reflected light pattern over an angle 92. Angle 92 is composed of an angle 93 and an angle 94. In this example, and preferably, angle 93 is substantially equal to angle 94. The mid-region of retro-reflectance occurs generally along line 96. In this example, line 96 lies in plane 90 and so can be regarded as being parallel to plane 90. Angle 93 and angle 94 each range from about 25° to 35° and preferably are each about 30°.

Reflector 82 and reflector 91 are each adapted to retro-reflect incident light continuously through a range of at least about 30° on either side of lines 87 and 96, respectively, the interrelationship between adjacent angles 86 and angles 92 along adjoining line 97. Preferably, angles 92 and 86 overlap slightly, but preferably not more than about 5°. Reflectors 82 and 91 can be comprised of sections of standard retro-reflective facets as those skilled in the art will appreciate. Angle 86 preferably similarly slightly overlaps line 85.

A bicycle (not shown) equipped with both wheels reflectorized as wheel 83, but with the reflector 91 arranged on the front wheel for forward viewing and turned on the rear wheel for rearward viewing, one reflector 82 facing on one side and another reflector 82 facing on the opposite side displays 360° flashing. Those skilled in the art will appreciate that a monocycle (one wheel which) need have only one end viewable reflector 91) but that a polycycle (vehicle having more than one wheel) needs two end viewable reflectors 91 because of inherent interference with end viewable reflectance patterns in vehicular regions during operation. For example, as wheel 83 revolves, the angle 92 and the angle 86 revolve about the axis 85. In effect, the line 87, for example, defines a connical pattern about the axis 85.

FIG. 17 illustrates graphically what happens to a pattern of retro-reflection when a side angle reflector which generates a pattern 62 as shown in FIG. 12 is angularly mounted on a wheel and the wheel revolved. The associated wheel can be considered to have an axis which falls on origin 81 of a polar coordinate graph as in FIG. 17. The perpendicular or 0° point of such side angle reflector has been moved away from origin 81 to a position 80. As the associated wheel revolves, the pattern 79 of generated light revolves around the origin 81 in spaced relationship thereto.

To produce a preferred type of reflectance pattern as illustrated in FIG. 17, a wide angle reflector 101 which produces a reflected light pattern, such as pattern 62 in FIG. 12, is, for example, associated with one side of a wheel member, such as wheel 100 in FIG. 16, in such a manner that reflector 101 produces a retro-reflected light pattern over an angle 102 measured from a perpendicular line 104 to the center plane 103 of wheel 100. Perpendicular line 104 may be considered in this example to coincide with the axis of wheel 100. The reflector 101 is so mounted on wheel 100 that its peak of retro-reflectance occurs generally along the straight line 105 which is inclined at an angle 106 of from about 40° to 50° with respect to perpendicular 104. In this example, the line 105 may be considered to bisect the angle 102. Preferably, angle 106 is about 45°.

Wheel 100 is also equipped with an end viewable reflector assembly 107 in such a manner that reflector 107 produces a retro-reflected light pattern over an angle 108. Angle 108 is composed of an angle 109 and an angle 110. In this example, and preferably, angle 109 is substantially equal to angle 110. The reflector 107 is so configured and mounted on wheel 100 that its peak retro-reflectance occurs forwardly generally along a straight line which is coincident with plane 103 of wheel 100. Angle 109 and angle 110 each range from about 25° to 35° and preferably are each about 30°.

Wheel 100 is further equipped with a second wide angle reflector 111 (shown by dotted lines in FIG. 16) in such a manner that reflector 111 produces a retro-reflected light pattern over an angle 112 measured from the line 104. Reflector 111 produces a reflected light pattern, such as pattern 62 in FIG. 12. Reflector 111 is so mounted on wheel 100 that its peak of retro-reflectance occurs sidewards generally along the straight line 113 which is inclined at an angle 114 of from about 10° to 20° with respect to line 104. In this example, the line 113 may be considered to bisect the angle 112. Preferably, angle 114 is about 15°.

Reflector 101 and reflector 111 are each adapted to retro-reflect incident light continuously through a range of at least about 30°, or at least about 15° on either side of respective lines 105 and 113. Reflector 107 is adapted to retro-reflect incident light continuously through a range of at least about 30° on either side of plane 103. The interrelationship between reflectors 101, 111 and 107 is such that there is no gap between adjacent angles 112, 102 and 108. Preferably, angles 112, 102 and 108 overlap slightly, but preferably not more than about 5°. Reflector 107 can be comprised of sections of standard retro-reflective facets, as those skilled in the art will appreciate. Angle 114 preferably similarly slightly overlaps line 85.

If a bicycle (not shown) is equipped with both wheels reflectorized in the manner of wheel 100, but with end viewable reflector 107 arranged for forward and rearward viewing, the resulting system displays 360° flashing. Observe that in this preferred embodiment, each of the light patterns 71, 72, 74 and 75 is defined by two separate reflectors, here reflectors 101 and 111.

A single wheel member, such as wheel member 100, may be equipped with side viewable reflectors retro-reflecting on each opposite side of wheel member 100. Thus, for example, referring to FIGS. 23 and 24, there is seen a reflector body 125 which is formed of a pair of adjoining molded transparent halves 126 and 127 secured together at their mating edges 128 by sonic welding, adhesive, or the like. The outside, opposed face of each half 126 and 127 can be considered to be a reflector face with standard and/or wide angle retro-reflective facets, as described for practicing a particular embodiment of this invention. Body 125 has suitably formed on opposed side edges integral clips 129 adapted to permit a body 125 to be clipped onto the spokes 130 of wheel 100 adjacent rim 131 thereof so that, in effect, a perpendicular 132 to opposed faces of body 125 is inclined at a predetermined desired angle to a line 104 of wheel 100.

When two such bodies 125 are used on a single wheel member, such as wheel 100, each body 125 being adapted to be inclined as above explained relative to the center plane 103 thereof, similar patterns of retro-reflected light are made on each side of wheel 100, as illustrated in FIG. 16. The manner in which the reflected light pattern produced by reflector 107 as wheel 100 revolves with such bodies 125 is also illustrated in FIG. 16. Preferably both wheels of a bicycle are equipped with such bodies 125.

Those skilled in the art will appreciate that FIG. 14 may be regarded as being illustrative of a special case for an embodiment of a system of the present invention where all the light patterns 70 through 75 happen to fall instantaneously in one plane just parallel to the ground as indicated above. As a wheel which produces the light pattern 70 through 75 revolves through 180°, the patterns 71, 70 and 75 interchange with the patterns 72, 73 and 74, respectively. The two side patterns 71 and 72 and the two side patterns 75 and 74 do not typically occur at the same instant in time. As such a wheel turns, for example, at certain points, patterns 71, 72, 74 and 75, respectively, disappear suddenly but, as such wheel continues to revolve, the patterns reappear again to such viewer except that they may be interchanged relative to their original position as shown, for example, in FIG. 14, depending on the viewer's position relative to the moving wheel.

It can occur that, if an observer is on an axis 85 of the hub of a wheel 83, no flashing signal is visible, owing to the fact that such observer is in a constant or identical relation to a flashable reflector. In this occurrence the observer is always looking at such reflector in the same attitude. However, by optimizing the angular disposition of the respective reflectors, such as reflector 87 on wheel 83, the angle of viewability where no flashing is conceivably possible is reduced to a statistical virtual impossibility. Moreover, as is the case in a preferred embodiment of the present invention, both wheels on one side of a vehicle are each equipped with a pair of wide angle reflectors so arranged that there is no practical impossibility of producing even at a single instant in time a position where a viewer will not view flashing retro-reflected light from some one wheel member. At a distance from a vehicle such as a bicycle equipped with a reflector system as provided in this invention, the angle one vehicle side between front and rear wheels becomes so small as to become negligible so that "dead" nonflashing spots become practically impossible to achieve.

While it is only necessary in a reflector system of this invention to use reflector arrangements, as hereinabove suggested, one may of course, employ a plurality of reflectors more than is required for 360° coverage.

In general, as those skilled in the art will appreciate, each wide angle reflector employed in the practice of this invention which is mounted on one wheel member at an angle in the range above indicated can be oriented angularly relative to either the axis of the associated wheel member or to a radius of the associated wheel member. For purposes of simplicity the angular displacement of each reflector used in a system of this invention can be regarded as being skewed at a specified angle relative to the plane centrally taken through the associated wheel member. The wheel can thus be regarded as having a center plane and each such reflector as having a center plane which is skewed to the center plane of the wheel, though it may be necessary to project a hypothetical extension of the center plane of such a reflector so as to cause same to intersect with the center plane of the wheel for measurement purposes. Those skilled in the art will also appreciate that many different angles and geometric shapes can be employed in any given embodiment of a system of the present invention as respects either the manner in which a given reflector is associated with a given wheel member or the manner in which a given reflector rotates with such wheel member as such wheel member revolves. A reflector can be positioned radially on a wheel member anywhere from a position about the axis of such a wheel member to a position adjacent the ground engaging edge or rim portion of the wheel member.

In FIGS. 18 through 21, there is seen illustrated one embodiment of one reflector system of the present invention. A bicycle 134 has wheels 135 and 136 which are each equipped with an end viewable wheel mounted reflector assembly 138 and with a side viewable reflector assembly 139 on wheel 135 and a side viewable reflector assembly 137 on wheel 136. Each wheel 135 and 136 may be regarded as being functionally similar to the wheel member 83 diagrammed in FIG. 15.

In FIG. 19, a portion of bicycle wheel 135 is shown mounted for rotation in a front fork member 140 of bicycle 134. The wheel 105 is provided with a hub 141 which is rotatably mounted on a fixed axle 142 secured conventionally between the opposed ends of the arms 143 and 144 of the fork member 140 with bolts 145. The hub 141 is conventionally connected by means of a plurality of spokes 146 to a rim member 147 in circumferentially spaced relationship thereto. A tire 148 is conventionally mounted on the rim 147. The width 149 of tire 148 and the width 150 of rim 147 are each considerably less than the width 151 of hub 141.

On the spokes 146 is mounted a reflector assembly 138. Reflector assembly 138 has a reflector body 152 which is generally rectangular in cross section and which has an outer or outside longitudinally extending edge 153 which is adapted to be in spaced, parallel relationship to an arm 143 of fork 140 as the wheel 135 rotates. Reflector assembly 138 has, mounted on another spoke 146 on the opposite side of wheel 135 and nearly aligned with the one spoke 146, a second reflector body 154. The reflector 154 is constructed in the same manner as the reflector 152 except that reflector 154 is adapted to retro-reflect incident light from the right side of wheel 135 in FIG. 2, while reflector 152 is adapted to retro-reflect incident light from the left side of wheel 135.

Referring, for example, to reflector 152 which is representative, such as is seen to comprise a plastic body comprised of two transparent members. Each member has a flat, smooth, opposed outer side surface, respectively, and a recessed adjacent inner side surface, respectively. These members are permanently joined together along their respective edge portions by an adhesive (not shown), by sonic welding, or by like fastening means.

The inner side surfaces each such member has molded thereinto prismatic retro-reflective surfaces, so that incident light striking the corresponding outer side such faces is retro-reflected conventionally over angles as hereinabove indicated. In the reflector 152, each outer side surface is adapted to reflect incident light from the left in FIG. 19 retro-reflectivity while in the reflector 154 each outer side surface is adapted to reflect incident light from the right in FIG. 18 retro-reflectivity. In general, a reflector 152 or 154 need only have standard reflective surfaces for acheiving flashing of retro-reflected light in accord with the teachings of the present invention. A reflector 152 or 154 can conveniently be formed of molded plastic portions such as of acrylic resin, or the like.

To secure a reflector 152 to wheel 135, spoke mounting means is provided. Here, for example, the reflector 152 is equipped with a pair of radially spaced integral, clip type brackets 155 and 156 on its inner edge 157. Each bracket 155 and 156 has a pair of circumferentially outwardly extending arms normally projecting outwardly and sidewards from edge 137. The length and shape of such arms is such as to permit same to engage a different side portion of an adjacent spoke member 118 in a snap fit. Back wheel 136 is similarly equipped with an assembly 138. Any convenient end viewable reflector assembly including wheel mounting means therefor may be employed in the practice of this invention.

In FIGS. 20 and 21 is depicted a side viewable reflector 139 suitable for use in the system of this invention mounted on wheel 135. Reflector 139 is mounted over a pair of the spokes 146 of wheel 135 of bicycle 134. The retro-reflective surface (constructed with facets molded into its back face as herein above described). The reflected light pattern associated with the reflector 139 extends in a radially outward direction with the long axis thereof being along the wheel 135, as shown by the arrow drawn on face 161. The reflector 139 is equipped with a pair of opposed outwardly extending ears 162, each of which contains an aperture 163. Through each aperture 163 extends a screw 164 which threadably engages a clamping nut 165; the combination mounts about each spoke 153 and 154, thereby positioning reflector 139 on wheel 135 adjacent the rim 147 thereof. Any convenient wide angle reflector assembly including wheel mounting means therefor may be employed in the practice of this invention. A perpendicular 166 to the face 161 of reflector 139 is canted at an angle relative to the center plane 167 of wheel 135 so that the peak of retro-reflectance of reflector 139 occurs sidewards generally along a straight line 168 which is inclined at an angle of from about 40° to 50° with respect to perpendicular 169 to center plane 167 of wheel 135.

Wheel 136 is equipped with a reflector 137 which is similar to reflector 139 except that reflector 139 is so mounted on wheel 136 that the peak of its retro-reflectance occurs sidewards generally along a straight line (not shown) which is inclined at an angle of from about 10° to 20° with respect to the perpendicular (not shown) to the center plane (not shown) of wheel 136.

The bicycle 134 thus equipped with reflectors 137, 139 and 139 on both sides of wheels 135 and 136 is adapted to be identified while moving by reflected light flashes viewable anywhere within a 360° circumference about bike 134 at night time in response to incident light thereon.

Additional reflectors within the spirit and teachings of this invention may be further secured to the wheels 135 and 136 to add to the light flashing effects if desired.

Shown in FIG. 22 is a reflector assembly 115 composed of two wide angle reflectors 116 and 117 which are integral with one another along a common edge 118. Opposed outside edge regions 119 and 120 of assembly 115 are equipped with spoke clips 122 for mounting assembly 115 to the spokes 124 of wheel member 123 adjacent the rim 121 thereof. Reflector 116 is thus so positioned on wheel member 123 that its peak of retro-reflectance occurs sidewards generally along a straight line 173 which is inclined at an angle of from about 10° to 20° (preferably 15°) with respect to a perpendicular 172 to the center plane 171 of wheel member 123, and reflector 117 is thus so positioned on wheel member 123 that its peak of retro-reflectance occurs sidewards generally along another straight line 174 which is inclined at an angle of from about 40° to 50° (preferably 45°) with respect to the perpendicular 172 to the center plane 171 of wheel member 123.

Those skilled in the art will appreciate that the midregion line of retro-reflectance or the (preferred) peak line of retro-reflection, the mid-region line and the peak line usually being preferably coincident, can, and usually does vary, from one particular reflector embodiment to another. For example, if one uses in each of the reflectors 116 and 117 of reflector assembly 115 a wide angle retro-reflective section having patterns such as shown in FIG. 10, the peak line occurs at about 35°. Thus, the face of reflector 117 and also the line of peak reflectance 173 are each tilted about 10° and, similarly the face of reflector 116 is tilted about 20° in the opposite direction.

Other and further embodiments and variations of the present invention will become apparent to those skilled in the art from a reading of the present specification taken together with the drawings and no undue limitations are to be inferred or implied from the present disclosure.

I claim as my invention:

1. In a wheel supported, reflectorized vehicle which moves by wheel rotation and which has weel mounted reflector means, each such means having one region comprised of transparent solid material which has a region axis normal thereto, said region having formed therein a group of cube corner reflector elements, all such elements in each such group each having a central optical axis, each respective such optical axis being disposed substantially parallel to the respective such optical axes of the other such elements in each such group, each such group being retroreflective of light directed thereon within a zone containing an inner zone of peak retroreflectance linearly extending away from said region, each such zone of retro-reflectance extending angularly and transversely relative to its said inner zone at least about 30°, the improvement which comprises the combination of A. from four through six such reflector means,
B. such reflector means each being adapted for functional association with selected respective side portions of such vehicles wheel members without interferring with rotational movements of such wheel members on their respective axles for front and side viewability thereof at spatial positions horizontally relatively removed from such vehicle,
C. mounting means mounting each such reflector means fixedly to such wheel members in such respective associations,
D. the angular relationship between the center plane of each such wheel member having such a reflector means so mounted thereon and the inner zone of peak retro-reflectance of each such respective reflector means so mounted thereon being such that
1. when each such reflectorized wheel member is rotated about its axle with the axis of rotation thereof spatially stationary
a. each such inner zone of peak retro-reflectance traverses a curved path in space,
b. each such path is generally radially adjacent to other such paths through 360° in a plane containing such axis of rotation, and
2. in such axis containing plane, the radial spacing between adjacent such paths is such that a flashing light signal of retroreflected light is viewable at any spatial position relatively remote from said wheel member.

2. An assembly for producing a light flashing effect comprising in combination
A. a rotatable wheel member having a wheel axis, and a center plane generally perpendicular to said wheel axis,
B. two reflector means, each such reflector means having at least one region comprised of transparent solid material and having a region axis normal thereto, said region having formed therein a group of cube corner reflector elements, such elements each having a central optical axis, each respective such optical axis being disposed substantially parallel to the respective such optical axes of the other such elements in said group, said region being retroreflective of incident light in a zone which extends at least about 30° from an inner zone of such retro-reflectance, the efficiency of retro-reflectance in the vicinity of said inner zone being at least about 75% the efficiency of retro-reflectance at about 30° from such inner zone being not less than about 25% of the light reflectance efficiency in said inner zone, C. one said reflector means being adapted for functional association with a side portion of said wheel member so that its said inner zone of retro-reflectance is generally normal to said wheel axis, D. the second said reflector means being adapted for functional association with a side portion of said wheel member so that its said inner zone of retro-reflectance is inclined at an angle of from about 25° to 35° with respect to a perpendicular to said center plane, and E. mounting means to mount each respective said reflector means fixedly to said wheel member in such association, F. said wheel member, said reflector means, and said mounting means coacting together so that, when said wheel member is rotated, said reflector means are adapted to produce flashing light signals viewable at any spatial position relatively remote from said assembly within a viewing angle extending over about 180° in a measurement plane extending perpendicularly through said center plane.

3. The assembly of claim 2 wherein said one reflector means is further characterized by having the respective optical axes of such elements comprising such group thereof generally parallel to said region axes thereof.

4. The assembly of claim 3 wherein said second reflector means is further characterized by having the respective optical axes of such elements comprising such group thereof inclined at a predetermined angle relative to said region axis thereof.

5. The assembly of claim 4 wherein said predetermined angle is such that the overlap angle of said zone of retro-reflectance from said second reflector means relative to said zone of reflectance from said first reflector means is less than about 15°.

6. The assembly of claim 2 wherein the angle subtended by the zone of retro-reflectance of said one reflector means overlaps the angle subtended by the zone of retro-reflectance of said second reflector means.

7. The assembly of claim 1 wherein said wheel member is spoked.

8. An assembly for producing a light flashing effect comprising in combination

A. a rotatable wheel member having a wheel axis, and a center plane generally perpendicular to said wheel axis, B. three reflector means, each such reflector means having at least one region comprised of transparent solid material and having a region axis normal thereto, said region having formed therein a group of cube corner reflector elements, all such elements in each such group each having a central optical axis, each respective such optical axis being disposed substantially parallel to the respective such optical axes of the other such elements in each such group, said one region of one such reflector means having the optical axes of the elements in its such group generally parallel to the region axis thereof, said one region of the second such reflector means having the optical axes of the elements in its such group inclined at a predetermined angle relative to the region axis thereof, said one region of the third such reflector means having the optical axes of the elements in its such group inclined at a predetermined angle relative to the region axis thereof, said one region of said one reflector means thus being adapted to retro-reflect impinging incident light over angles of about 30° relative to said region axis thereof, said one region of each of said second reflector means and said third reflector means each thus being adapted to retro-reflect impinging incident light over angles ranging from at least about 30° up to at least about 45° in the direction of each respective said predetermined angle, each said one region having a peak zone of such retro-reflectance, C. said one reflector means being adapted for functional association with a side portion of said wheel member so that its said peak zone of retro-reflectance is generally coincident with said center plane in one direction, D. said second reflector means being adapted for functional association with a side portion of said wheel member so that its said peak zone of retroreflectance is from about 40° to 50° with respect to said wheel axis, E. said third reflector means being adapted for functional association with a side portion of said wheel member so that its said peak zone of retro-reflectance is from about 10° to 20° with respect to said wheel axis, and F. mounting means to mount each such reflector means fixedly to said wheel member in such respective association, G. said wheel member said reflector means, and said mounting means coacting together so that, when said wheel member is rotated, said reflector means are adapted to produce flashing light signals viewable at any spatial position relatively remote from said assembly within a viewing angle extending over about 180° in a measurement plane extending perpendicularly through said center plane.

9. The assembly of claim 8 wherein said wheel member is spoked.

* * * * *